United States Patent
Strandemar

(10) Patent No.: US 10,803,559 B2
(45) Date of Patent: Oct. 13, 2020

(54) FUSED IMAGE OPTIMIZATION SYSTEMS AND METHODS

(71) Applicant: FLIR Systems AB, Taby (SE)

(72) Inventor: Katrin Strandemar, Rimbo (SE)

(73) Assignee: FLIR SYSTEMS AB, Täby (SE)

( * ) Notice: Subject to any disclaimer, the term of this patent is extended or adjusted under 35 U.S.C. 154(b) by 105 days.

(21) Appl. No.: 16/243,356

(22) Filed: Jan. 9, 2019

(65) Prior Publication Data

US 2019/0147569 A1 May 16, 2019

Related U.S. Application Data

(63) Continuation of application No. PCT/US2017/043181, filed on Jul. 20, 2017.

(60) Provisional application No. 62/365,318, filed on Jul. 21, 2016.

(51) Int. Cl.
*G06T 5/50* (2006.01)
*G06T 5/00* (2006.01)
*G06T 3/40* (2006.01)

(52) U.S. Cl.
CPC .............. *G06T 5/003* (2013.01); *G06T 3/403* (2013.01); *G06T 5/50* (2013.01); *G06T 2207/10032* (2013.01); *G06T 2207/10048* (2013.01); *G06T 2207/20192* (2013.01); *G06T 2207/20221* (2013.01); *G06T 2207/30181* (2013.01); *G06T 2207/30232* (2013.01)

(58) Field of Classification Search
CPC ........... G06T 3/40; G06T 3/403; G06T 5/003; G06T 5/50; G06T 7/13; G06T 7/174; G06T 7/97; G06T 2207/20192; G06T 2207/20212; G06T 2207/20221
See application file for complete search history.

(56) References Cited

U.S. PATENT DOCUMENTS 9,317,903 B1 * 4/2016 Liu et al. .............. G06T 3/4053
2017/0109599 A1 * 4/2017 Gupta et al. .............. G06T 7/11

FOREIGN PATENT DOCUMENTS

WO WO 2016/109585 A1 7/2016

OTHER PUBLICATIONS

Thomanek et al., "A New Pixel-based Fusion Framework to Enhance Object Detection in Automotive Applications", International Society of Information Fusion, Jul. 7, 2014, pp. 1-8, XP032653963, 17th International Conference on Information Fusion, 2014, At Salamanca, Spain.

(Continued)

*Primary Examiner* — Andrew W Johns
(74) *Attorney, Agent, or Firm* — Haynes and Boone, LLP

(57) ABSTRACT

Systems and methods disclosed herein, in accordance with one or more embodiments, provide for the generation of a fused image optimized for a target resolution, such as by receiving an infrared (IR) image captured by an IR imaging sensor, receiving a visible light (VL) image captured by a VL imaging sensor, determining a scaling factor based on a difference between the target resolution and a baseline resolution, and determining a set of target fusion parameters at least by modifying, according to the scaling factor, a set of baseline fusion parameters associated with the baseline resolution. A fused image is generated having the target resolution at least by fusing the IR image and the VL image according to the set of target fusion parameters.

20 Claims, 6 Drawing Sheets

(56) References Cited

OTHER PUBLICATIONS

Yao et al., "Multi-source Airborne IR and Optical Image Fusion and Its Application to Target Detection", Department of Computer Science, Tennessee State University, from book Advances in Visual Computing: 4th International Symposium, ISVC 2008, Dec. 1, 2008, Proceedings, Part II, pp. 651-660, XP047396091, ISSN: 0302-9743, ISBN: 978-3-540-85989-5, Network and Parallel Computing, Lecture Notes in Computer Science, Springer International Publishing, Cham, Las Vegas, NV, USA.

* cited by examiner

FUSED IMAGE OPTIMIZATION SYSTEMS AND METHODS

CROSS-REFERENCE TO RELATED APPLICATIONS

This application is a continuation of International Patent Application No. PCT/US2017/043181 filed Jul. 20, 2017 and entitled "FUSED IMAGE OPTIMIZATION SYSTEMS AND METHODS," which is incorporated herein by reference in its entirety.

International Patent Application No. PCT/US2017/043181 filed Jul. 20, 2017 claims priority to and the benefit of U.S. Provisional Patent Application No. 62/365,318 filed Jul. 21, 2016 and entitled "FUSED IMAGE OPTIMIZATION SYSTEMS AND METHODS," which is hereby incorporated by reference in its entirety.

TECHNICAL FIELD

One or more embodiments of the present disclosure relates generally to image fusion systems and methods and more particularly, for example, to systems and methods for optimizing and resealing fused images.

BACKGROUND

Thermal, or infrared (IR), images of scenes are often useful for monitoring, inspection and/or maintenance purposes, e.g. within the technical fields of construction or electrical work, but also for many other applications.

To make it easier for a user to interpret and analyze a scene captured by a thermal, or IR, imaging device, the imaging device can comprise two or more imaging systems adapted to capture visual images and IR images respectively, and the imaging device can be adapted to be able to combine, or fuse, the captured visual image data and the IR image data.

It is sometimes desired to view a fused image on a display having a different resolution than the original fused image. The fused image then must be resealed. A resealed fused image may have a lower visual quality than the original fused image.

SUMMARY

The present disclosure comprises embodiments that may solve or at least reduce the problems mentioned above. For example, one or more embodiments of the disclosure achieve generation of a second fused image having a second resolution (also referred to herein as a target resolution) that differs from a first resolution (also referred to herein as a baseline or default resolution), by receiving raw IR image data and raw visual image data and obtaining a first set of fusion parameters. The first set of fusion parameters are adapted for generating a first fused image having a first resolution by fusing the raw IR image data and the raw visual image data. It should be appreciated that a first fused image does not actually need to be generated—the first set of fusion parameters may, for example, correspond to default or baseline parameters of the system, which are adapted for generating a fused image having a first resolution, such as some predetermined default or baseline resolution.

A scaling factor based on the difference between the first resolution and the second resolution is determined, and based on this scaling factor and the first set of fusion parameters, a second set of fusion parameters is generated. For example, the second set of fusion parameters (also referred to herein as a set of target fusion parameters) may be determined as a modification of the first set of fusion parameters (also referred to herein as a set of baseline fusion parameters) according to the scaling factor. A second fused image is then generated by fusing the raw IR image data and the raw visual image data using the second set of fusion parameters. By using the raw IR image data and the raw visual image data and fusing them according to a set of fusion parameters which have been adapted to the desired target resolution, the visual quality of the resealed fused image at the target resolution may be as good as the visual quality of a fused image at the baseline/default resolution.

In embodiments, the first set of fusion parameters comprises a first set of filter parameters, which control the filtering of the visual image to extract contour/edge information adapted for generating the first fused image, and the second set of fusion parameters comprises a second set of filter parameters, which control the filtering of the visual image to extract contour/edge information used in the second fused image. By adapting the filter parameters, it is possible to extract the contour/edge information in a way more suited to the target resolution.

In one or more embodiments, the second set of filter parameters are generated based on the first set of filter parameters and the scaling factor.

The first set of filter parameters may comprise a first filter core size and a first filter core shape, and the second set of filter parameters may comprise a second filter core size and a second filter core shape.

In one or more embodiments, the second filter core size is generated based on the first filter core size and the scaling factor, but the second filter core shape is the same as the first filter core shape.

In embodiments, the first set of fusion parameters comprises a first alpha parameter set $\alpha_1$, which determines how the color information and the luminance information from the IR image data and the visual image data are adapted to be combined for generating the first fused image, and the second set of fusion parameters comprises a second alpha parameter set $\alpha_2$, which determines how the color information and the luminance information from the IR image data and the visual image data are combined to generate the second fused image.

In embodiments, the first set of fusion parameters comprises a first IR image resampling parameter $r_{I1}$, which is calculated based on the difference between the raw IR image resolution and the first resolution, and a first visual image resampling parameter $r_{V1}$, which is calculated based on the difference between the raw visual image resolution and the first resolution. The term "raw" image resolution as used herein is understood to be associated with a native resolution provided by the imaging sensors and systems capturing the images (e.g., which may or may not be the same as the pixel resolution of the imaging sensors).

In embodiments, the second set of fusion parameters comprises a second IR image resampling parameter $r_{I2}$, which is calculated based on the difference between the raw IR image resolution and the second resolution, and a second visual image resampling parameter $r_{V2}$, which is calculated based on the difference between the raw visual image resolution and the second resolution.

In embodiments, the first set of fusion parameters comprises a first set of filter parameters, which control the filtering of the visual image to extract contour/edge information adapted for generating the first fused image, and a first alpha parameter set $\alpha_1$, which determines how the color information and the luminance information from the IR image data and the visual image data are adapted to be combined for generating the first fused image, and the second set of fusion parameters comprises a second set of filter parameters, which control the filtering of the visual image to extract contour/edge information used in the second fused image, and a second alpha parameter set $\alpha_2$, which determines how the color information and the luminance information from the IR image data and the visual image data are combined to generate the second fused image. In embodiments, the second set of filter parameters is generated based on the first set of filter parameters and the scaling factor, but the second alpha parameter set $\alpha_2$ is the same as the first alpha parameter set $\alpha_1$. In other embodiments, the second set of filter parameters is generated based on the first set of filter parameters and the scaling factor, and the second alpha parameter set $\alpha_2$ is generated based on the first alpha parameter set $\alpha_1$ and the scaling factor.

In one or more embodiments, the second fused image is displayed on a display having the second resolution.

In one or more embodiments, the second fused image is printed on a printer having the second resolution.

Embodiments of the disclosure achieve a computer-readable medium comprising, stored thereon, non-transitory information configured to control a processor/processing unit to perform any of the steps or functions of any of the embodiments described herein.

Embodiments of the disclosure achieve a computer program product comprising code portions adapted to control a processor to perform any of the steps or functions of any of the embodiments described herein.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Introduction

Figure 1A:
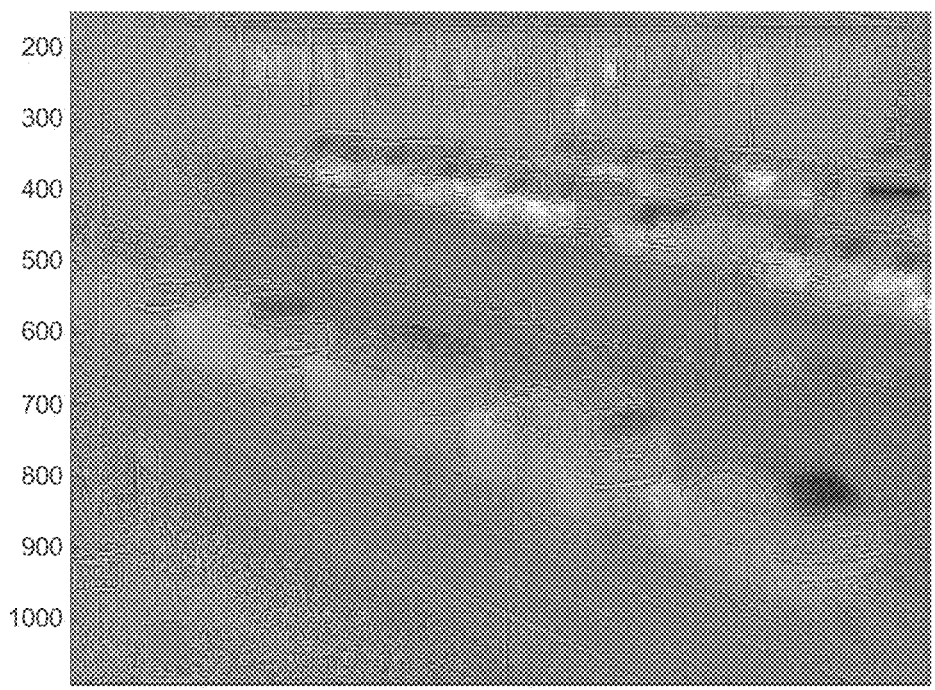
FIGS. 1a, 2a and 3a show examples of a fused image having a first resolution, in accordance with an embodiment of the disclosure.

The present disclosure relates to optimization of the appearance of a fused image after rescaling. The fused image is in this disclosure an IR image and a visual image which have been fused. The IR image may be any kind of infrared or thermal image where different colors or grayscale values represent different relative temperature intervals. The visual image may be any kind of image obtained using an optical or visual imaging device, regardless of whether visual light or any other kind of light, e.g. near infrared light, is used to obtain the image.

In order to obtain a fused image, IR image data and visual image data are fused using a set of fusion parameters. The set of fusion parameters may e.g. comprise resampling parameters, filter parameters, and alpha parameters.

Resampling parameters are calculated based on the difference between the raw image data resolution and the desired resolution of the fused image. Since the visual image and the IR image often have different resolutions, two different resampling parameters are often needed: an IR image resampling parameter $r_I$, which is calculated based on the difference between the raw IR image resolution and the desired resolution of the fused image, and a visual image resampling parameter $r_V$, which is calculated based on the difference between the raw visual image resolution and the desired resolution of the fused image.

Filter parameters control the filtering of the visual image to extract contour/edge information to be used for obtaining the fused image. Filter parameters may for example comprise the filter core size (e.g. 3×3 or 5×5) and the filter core shape (e.g. flat or Gaussian).

Alpha ($\alpha$) parameters determine how the IR image and the visual image are combined to generate the fused image, e.g. how the color information and the luminance information from the IR image and the visual image should be combined. In various embodiments, alpha parameters determine the relative contribution of the IR image and the visible image when those images are fused, and may, for example, be represented using a value between 0 and 1, inclusive (i.e., $0 \leq \alpha \leq 1$).

Fused images can be generated based on many different alpha parameter sets. An alpha parameter set may comprise separate alpha parameters for the luminance component and each of the color components of the fused image. Each of these alpha parameters defines how to combine the IR image data and the contour/edge information from the visual image data in order to generate each of the luminance component and each of the color components of the fused image. The variation of each of the alpha parameters thus gives the user an opportunity to decide how much contrast is needed in each of the components in the fused image. If both the IR image data and the contour/edge information from the visual image data is used for generating both the luminance component and each of the color components of the fused image, then all the alpha parameters have values above 0.

A very simple alpha parameter setup is to add the IR image data only to the color components of the fused image and the contour/edge information from the visual image data only to the luminance component of the fused image. This means that the color alpha parameters are set to 0 and the luminance component alpha parameter is set to 1.

Another simple alpha parameter setup is to add the IR image data only to the color components of the fused image, and generate the luminance of the combined image by adding the contour/edge information from the visual image data multiplied by the luminance alpha parameter to the luminance of the IR image. This means that the color alpha parameters are set to 0 and the luminance component alpha parameter is selected to get the desired contrast in the combined image.

Figure 2A:
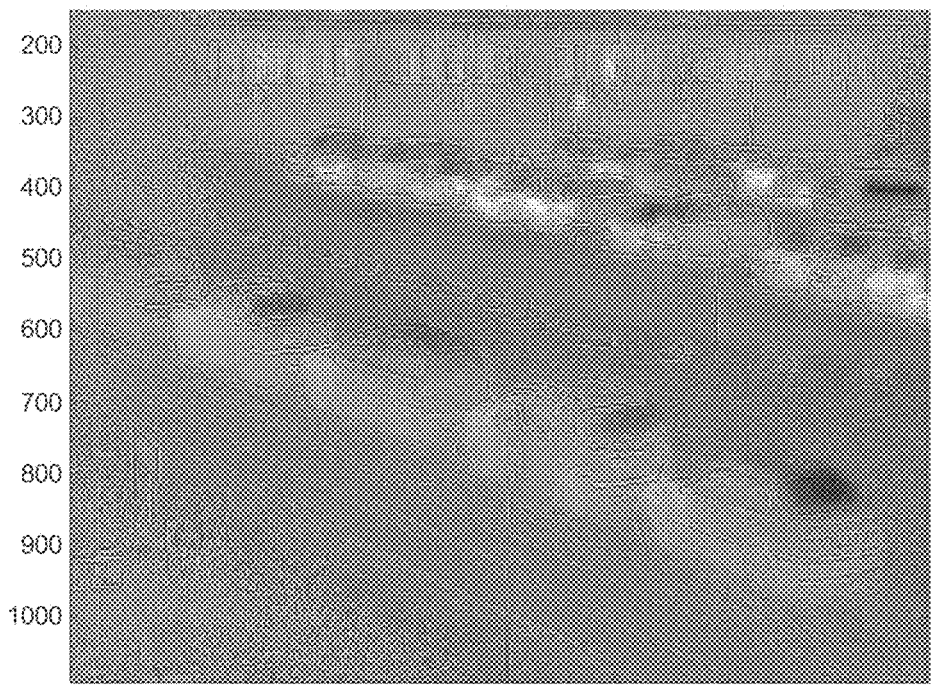
Figure 3A:
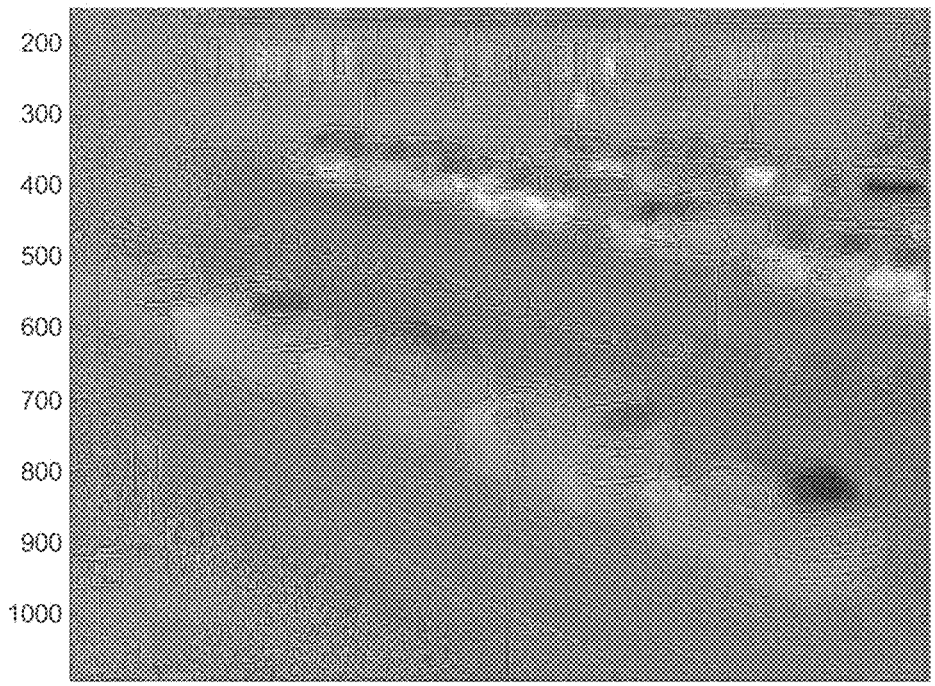

Fused images can be generated, for example, according to various techniques from FLIR Systems AB (see, e.g., U.S. Pat. No. 8,520,970 entitled "Infrared Resolution and Contrast Enhancement with Fusion", which is hereby incorporated by reference in its entirety), which relate to high contrast fusion of IR image data and visual image data, or more specifically to introducing contour/edge content from a visual image into an IR image, thus increasing the perceived sharpness of the total fused image. An example of such a fused image is shown in FIGS. 1a, 2a and 3a.

The fusion method described in U.S. Pat. No. 8,520,970 and other fusion methods produce suitable results in case the display on which the fused image is displayed has the same resolution as the fused image. Visual images however often have a very high resolution, e.g. 5, 8, 10 or more Mpixels, while the display on which the fused image is displayed often has a significantly lower resolution, such as e.g. a hundred times lower or a thousand times lower, especially if the display is the camera display. The necessary downsampling of the image data may in this case introduce aliasing effects into the fused image, due to folding distortion, thereby rendering a visually low quality image which provides a poor user experience and is hard to interpret. An example of this is shown in FIG. 1b.

Another problem which may arise when viewing a fused image on a display not having the same resolution as the fused image is that the contours or edges of the fused image may become thicker after rescaling of the image. An example of this is shown in FIG. 2b.

Figure 1B:
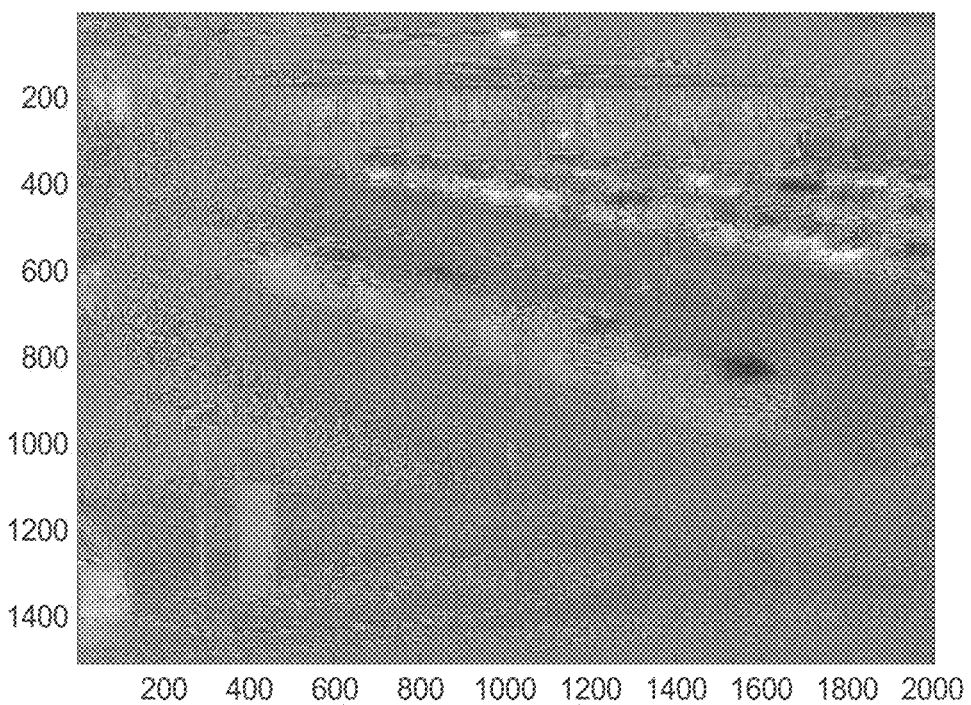
FIG. 1b shows an example of a fused image having a second resolution, obtained without the optimization techniques of embodiments of the disclosure, which fused image shows aliasing effects.
Figure 2B:
FIG. 2b shows an example of a fused image having a second resolution, obtained without the optimization techniques of embodiments of the disclosure, which fused image shows overly thick contours/edges.

Depending on which display the user chooses for viewing the fused image, the user may thus have problems with the fused image looking different and sometimes being difficult to interpret, as shown in FIGS. 1b and 2b.

Figure 3B:
FIG. 3b shows an example of a fused image having a second resolution, obtained in accordance with one or more embodiments of the disclosure.

Such problems can be mitigated or overcome in systems and methods according to embodiments of the disclosure, for example, by generating a rescaled fused image based on the original raw visual and IR image data using a different set of fusion parameters than what was used for generating the original fused image. An example of a fused image generated in this way is shown in FIG. 3b.

The set of fusion parameters used to generate the rescaled fused image may ensure that the amplitude and thickness of the contours/edges of the rescaled fused image are approximately the same as the amplitude/thickness of the original fused image, in relation to the real world object that is depicted. In this way, the amplitude and thickness of the contours/edges of the fused image will be approximately the same, in relation to the size of other objects in the depicted scene, regardless of the display resolution. A contour/edge (e.g. a cable) may thus e.g. be represented by 2 pixels or 20 pixels depending on the resolution of the display that is used.

In this way, although fused images may not be identical on displays with different resolution, they will appear to be similar, and the user's experience of the image is maintained independently of the resolution properties of the display(s) used for viewing the resulting fused image. Furthermore, aliasing is reduced drastically. These advantageous effects are obtained using one or more of the method and system embodiments presented herein.

The second set of fusion parameters used to generate the rescaled fused image may be generated by applying a predetermined function, which is dependent on the scaling factor between the original and new resolutions, to the original first set of fusion parameters. The predetermined function may e.g. be a look-up-table (LUT) or a set of predefined equations designed to regenerate the contour/edge information from the visual image to better match the current display before fusing the visual image data with the infrared image data.

The LUT values and/or the equation parameters may be set such that the amplitude (e.g., intensity) and thickness of the edges (e.g., thickness relative to other portions of the fused image) that are added from introducing the contour/edge information from the visual image are approximately the same regardless of the display resolution.

As explained, the sets of fusion parameters may e.g. comprise resampling parameters, filter parameters, and alpha ($\alpha$) parameters, and the filter parameters may e.g. comprise the filter core size and the filter core shape. When generating the second set of fusion parameters, based on the scaling factor and the original first set of fusion parameters, it is not necessary to change all of these parameters—some of them may be the same in the second set of fusion parameters as in the first set of fusion parameters.

For example, the change in filter core size may be directly proportional to the scaling factor, so that e.g. if the image size is doubled, the filter core size is also doubled. If this is possible, it may not be necessary to change all of the other fusion parameters—the filter core shape and the alpha ($\alpha$) parameters may e.g. be the same in the second set of fusion parameters as in the first set of fusion parameters. If the filter core size in such a case would become large (e.g., larger than a first predetermined filter core size threshold), in some embodiments the filter core shape may also be changed, e.g. from a flat filter core into a Gaussian filter core, but the alpha ($\alpha$) parameters may still be the same in the second set of fusion parameters as in the first set of fusion parameters.

However, if such a scaling of the filter core size would make this very large (e.g., larger than a second predetermined filter core size threshold), too much processing power may be required for the filtering for this to be a realistic option. In such a case, the alpha ($\alpha$) parameters may be changed to compensate for a filter core size which is not large enough, according to some embodiments. In such a case, both the filter core size and the alpha ($\alpha$) parameters would thus be different in the second set of fusion parameters to what they are in the first set of fusion parameters. In order to determine the target alpha ($\alpha$) parameters to use in such situations, a look-up-table (LUT) may e.g. be used to modify baseline alpha parameters It is also possible to change only the alpha ($\alpha$) parameters in the second set of fusion parameters, and let all the other parameters be the same as in the first set of fusion parameters. This would generate a second fused image that may look rather different from the first fused image, but the visual quality of the rescaled fused image may still be as good as the visual quality of the original fused image, since it is the alpha ($\alpha$) parameters that control how strongly the contours/edges appear in the second fused image.

Thus, according to the disclosure, change of one, some or all of the fusion parameters may be used to generate a second fused image having a second resolution that differs from a first image.

System Embodiments

Figure 4:
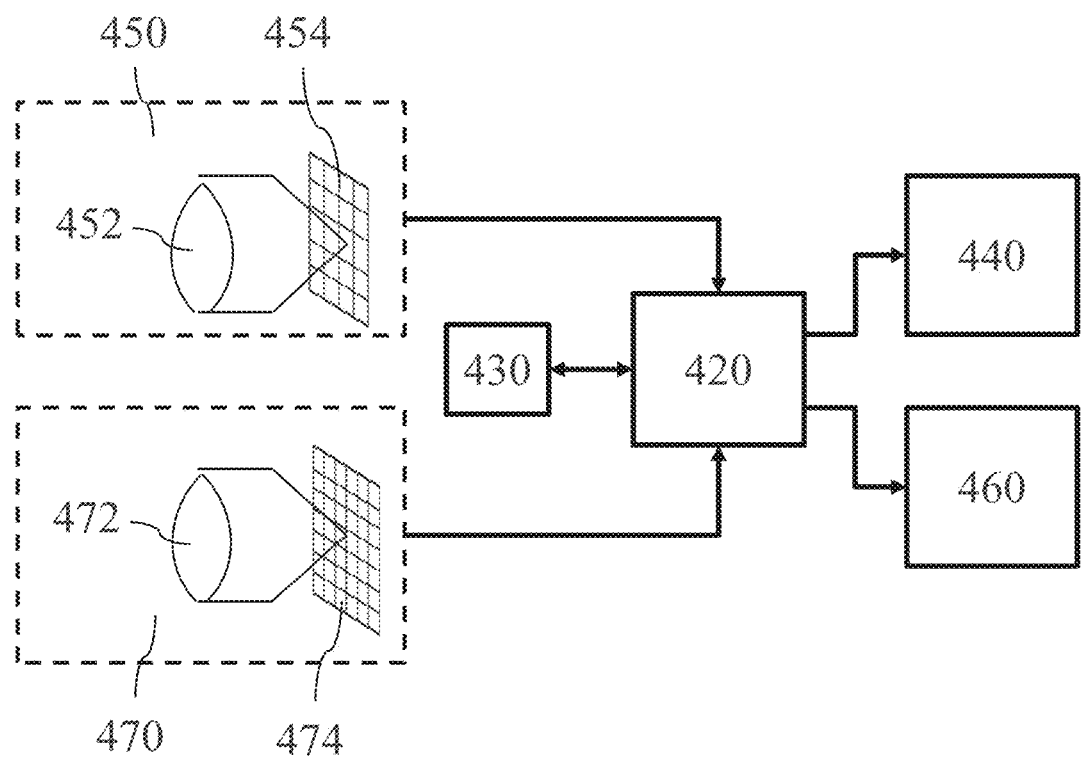
FIG. 4 shows a schematic view of a system in accordance with one or more embodiments of the disclosure.

FIG. 4 shows a schematic view of a system according to one or more embodiments of the disclosure. The system comprises a thermography arrangement or infrared IR camera that is configured to capture infrared (IR) image data values, representing infrared radiation emitted from a scene by an infrared (IR) imaging system 450. The IR imaging system 450 employs an infrared (IR) optical system 452, e.g. comprising a lens, zoom functionality and focus functionality, together with a corresponding IR detector 454, for example comprising a micro-bolometer focal plane array, to provide an IR image in the form of a signal frame of IR image data values, representing infrared radiation emitted from a scene.

The system further comprises a visible light (VL) imaging system 470 that is configured to capture visible light (VL) image data values, representing VL emitted from a scene. The VL imaging system employs an visible light (VL) optical system 472, e.g. comprising a lens, zoom functionality and focus functionality, together with a corresponding VL detector 474, for example comprising a digital charge-coupled device (CCD) or complementary metal-oxide-semiconductor (CMOS) active pixel sensors, to provide an VL image in the form of a signal frame of VL image data values, representing VL emitted from a scene.

The infrared (IR) imaging system 450 and the VL imaging system 470 may further be arranged to send the signal frames of IR image data values and VL image data values to a processor 420. The processor 420 may be provided with specifically designed programming or program code portions adapted to control the processor 420 to perform the operations and functions of embodiments of various methods described herein. The system may further comprise at least one memory 430 configured to store data values or parameters received from the processor 420 or to retrieve and send image data values or parameters to the processor 420.

An exemplary embodiment of the operation of such a system, such as an IR camera, is generally as follows: Infrared energy is accepted via said infrared optical system 452 and directed onto the IR detector elements 454. Each detector element responds to the infrared radiation or heat energy received. A frame of infrared (IR) image data values may, for example, be captured by scanning all the rows and columns of the detector and, in some embodiments, analog to digital converted to obtain a captured IR image wherein image data values associated to each detector element is referred to as an IR image data value having an associated row and column index.

The VL imaging system 470 may be adapted to capture electromagnetic radiation in other non-thermal wavelengths in addition to or in place of visible light wavelengths. For example, the VL imaging system 470 may be configured to capture near-infrared (NIR) light, short wave infrared (SWIR) light, ultra-violet (UV) light, or other non-thermal light in addition to or in place of visible light. For such embodiments, the VL imaging system 470 may represent a non-thermal imaging system comprising a non-thermal optical system (represented by the VL optical system 472) and a non-thermal detector (represented by the VL detector 474) responsive to non-thermal radiation. For example, electron multiplying CCD (EMCCD) sensors, scientific CMOS (sCMOS) sensors, intensified charge-coupled device (ICCD) sensors, as well as CCD-based and CMOS-based sensors discussed above and/or other suitable sensors, may be used to implement the non-thermal detector (represented by the VL detector 474) to detect NIR light, SWIR light, and/or other non-thermal light.

In one or more embodiments, the system further comprises a display 440 and/or a printer 460 configured to receive a signal from the processor 420 and to display the received signal as a fused image, e.g. to a user of the system. In one or more embodiments, the display 440 is provided in an image-presenting unit. In one or more embodiments, the display 440 is integrated with a user input device configured to receive user input signals or indications from a user.

In one or more embodiments, the processor 420 is further arranged to send the received IR image as a signal frame of IR image data values to an external processor unit (not shown in FIG. 4).

In one or more embodiments, the processor 420 may be a processor such as a general or specific purpose processor unit for example a microprocessor, microcontroller or other control logic that comprises sections of code or code portions, stored on a computer readable storage medium, such as the memory 430, that are fixed to perform certain tasks but also other alterable sections of code, stored on a computer readable storage medium, that can be altered during use. Such alterable sections of code can comprise parameters that are to be used as input for the various tasks, such as the calibration of the system, adaption of the sample rate or the filter for the spatial filtering of the images, or any other parameter related operations known to a person skilled in the art.

In one or more embodiments, the processor 420 is configurable using a hardware description language (HDL).

In one or more embodiments, the processor 420 is a field-programmable gate array (FPGA), i.e. an integrated circuit designed to be configured by the customer or designer after manufacturing and configurable using a hardware description language (HDL). For this purpose, embodiments of the disclosure may comprise configuration data configured to control an FPGA to perform the operations and functions of the method embodiments described herein.

In this document, the terms "computer program product" and "computer-readable storage medium" may be used generally to refer to media such as the memory 430 or the storage medium of processor 420 or an external storage medium. These and other forms of computer-readable storage media may be used to provide instructions to processor 420 for execution. Such instructions, generally referred to as "computer program code" (which may be grouped in the form of computer programs or other groupings), when executed, enable the system to perform features or functions of embodiments of the disclosure. Further, as used herein, "logic" may include hardware, software, firmware, or a combination of thereof. The system further comprises a display 440 and/or a printer 460, for displaying and/or printing the second fused image.

Method Embodiments

Figure 5:
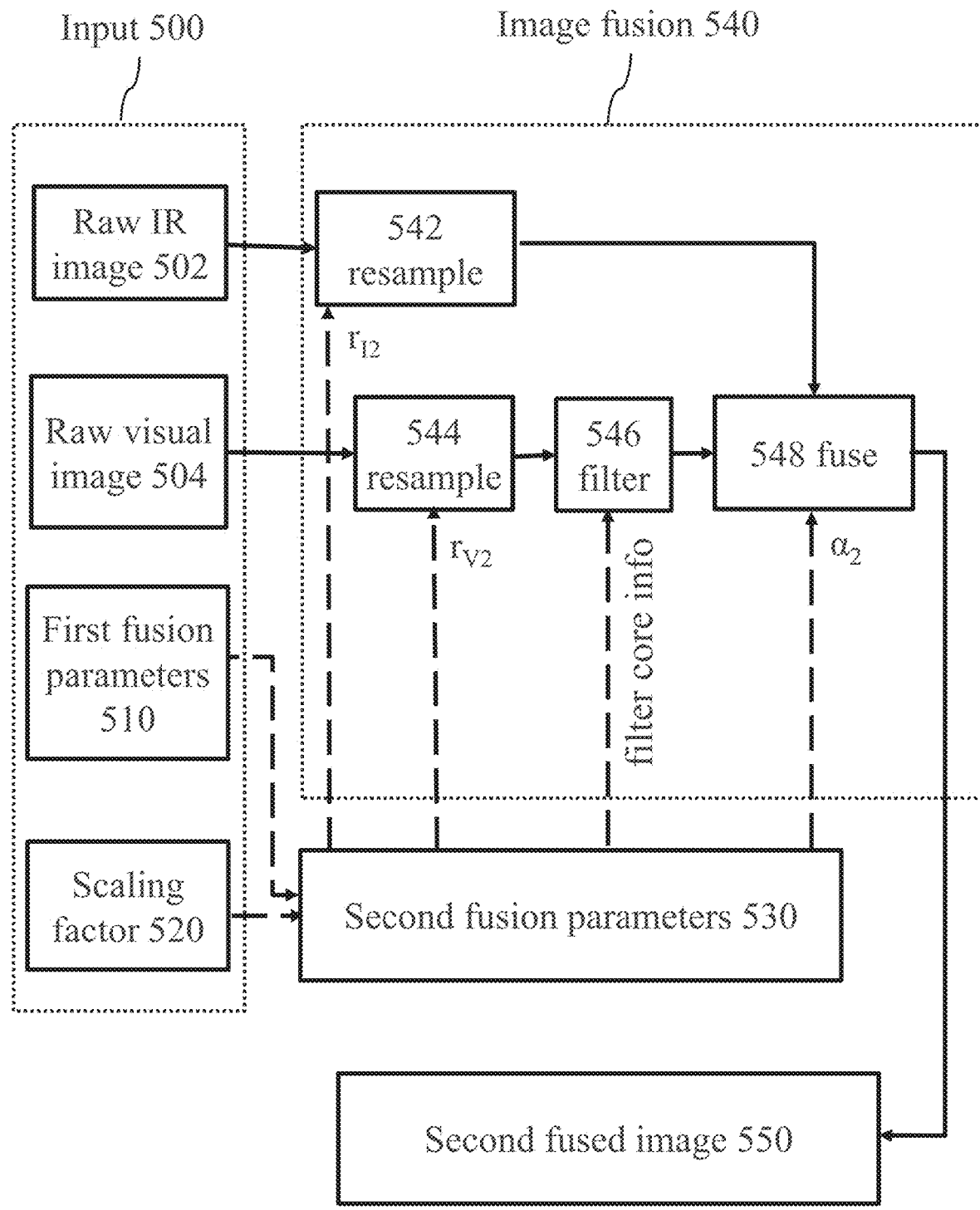
FIG. 5 is a flow diagram of a method in accordance with one or more embodiments of the disclosure.

FIG. 5 is a flow diagram of a method in accordance with one or more embodiments of the disclosure.

From FIG. 5 it can be seen that raw IR image data 502 and raw visual image data 504 are received from input 500, e.g. in the form of image files. Input 500 may be any kind of storage or processor which can provide the desired data. Input 500 may, as shown in FIG. 4, comprise several different input devices, such as an IR imaging system 450 providing the raw IR image data 502, a VL imaging system 470 providing the raw visual image data 504, and a memory 430. Input 500 may also comprise other types of storage or processing devices providing the first fusion parameters and the scaling factor. If the first fused image is adapted to be generated by the same processor 420 as the second fused image, there may be no need for inputting the first fusion parameters from e.g. memory 430, since they may already be known by the processor 420. Instead of providing the scaling factor from e.g. memory 430, the input may provide the second resolution from a display 440 or a printer 460, and the processor 420 may calculate the scaling factor based on the first resolution and the second resolution. The term "raw" image data as used herein, for example as used in raw IR image data 502 and raw visual image data 504, is understood to refer to image data that has not been used for fusion and not intended to exclude other processing on the image data that may be performed by imaging sensors, imaging systems, or other processors.

A first set of fusion parameters 510 may be received from the same input 500, or from a different input. The first set of fusion parameters 510 may also be obtained by the processor 420 when generating the first fused image, if this is generated there. As explained, it is not necessary to actually generate a first fused image—the first set of fusion parameters 510 may e.g. be the default parameters of the system, which are adapted for generating a fused image having a first resolution.

A scaling factor 520 may be received from the same input 500, from a different input, or be determined by the processor 420 that performs the image fusion. The scaling factor 520 is determined based on the difference between the first resolution and the second resolution.

The second set of fusion parameters 530 is generated based on the first set of fusion parameters 510 and the scaling factor 520 by applying a predetermined function. The predetermined function may be a look-up-table (LUT) or a set of predefined equations designed to regenerate the contour/edge information from the visual image to better match the current display before fusing the visual image data with the infrared image data. The second set of fusion parameters 530 may be generated in the processor 420 or in a different processor.

The fusion parameters may in one or more embodiments comprise resampling parameters for resampling the IR image and/or the visual image, filter parameters for controlling the filtering of the visual image to extract contour/edge information, and alpha ($\alpha$) parameters for controlling how the IR image data and the visual image data should be combined, but not necessarily all of these.

In one or more embodiments, the first set of fusion parameters comprises a first set of filter parameters and a first alpha parameter set $\alpha_1$. The LUT/equation applied to the set of filter parameters may then be different to the LUT/equation applied to the alpha ($\alpha$) parameters. The scaling factor 520 may thus not affect the filter parameters in the same way as the alpha ($\alpha$) parameters. The first alpha parameter set $\alpha_1$ and the second alpha parameter set $\alpha_2$ may even be the same even if the second set of filter parameters differs from the first set of filter parameters, or the other way around. The scaling factor 520 may thus in one or more embodiments be applied to only some of the fusion parameters.

The LUT/equations may in one or more embodiments give a second filter core size. The size of the filter core is, according to embodiments, increased in relation to an increased resolution of the display. The relation may be linear, so that a doubling of the resolution means a doubled filter core size, but also non-linear relations are possible for some embodiments.

The second fused image 550 is generated in an image fusion process 540 using the second set of fusion parameters 530. The image fusion process 540 may comprise different process steps. If the resolution of the raw IR image 502 differs from the second resolution, the raw IR image 502 may be resampled 542 using the second IR image resampling parameter $r_{I2}$ before image fusion. If the resolution of the raw visual image 504 differs from the second resolution, the raw visual image 504 may be resampled 544 using the second visual image resampling parameter $r_{V2}$ before image fusion.

The visual image may be filtered 546 using a second set of filter parameters in order to extract contour/edge information. The second set of filter parameters may be generated based on the first set of filter parameters and the scaling factor 520.

The second fused image 550 is fused 548 from the IR image data and the visual image data using the second alpha parameter set $\alpha_2$.

The second fused image may be stored in the original image file or as part of a new image file, or just be displayed or printed.

Figure 6:
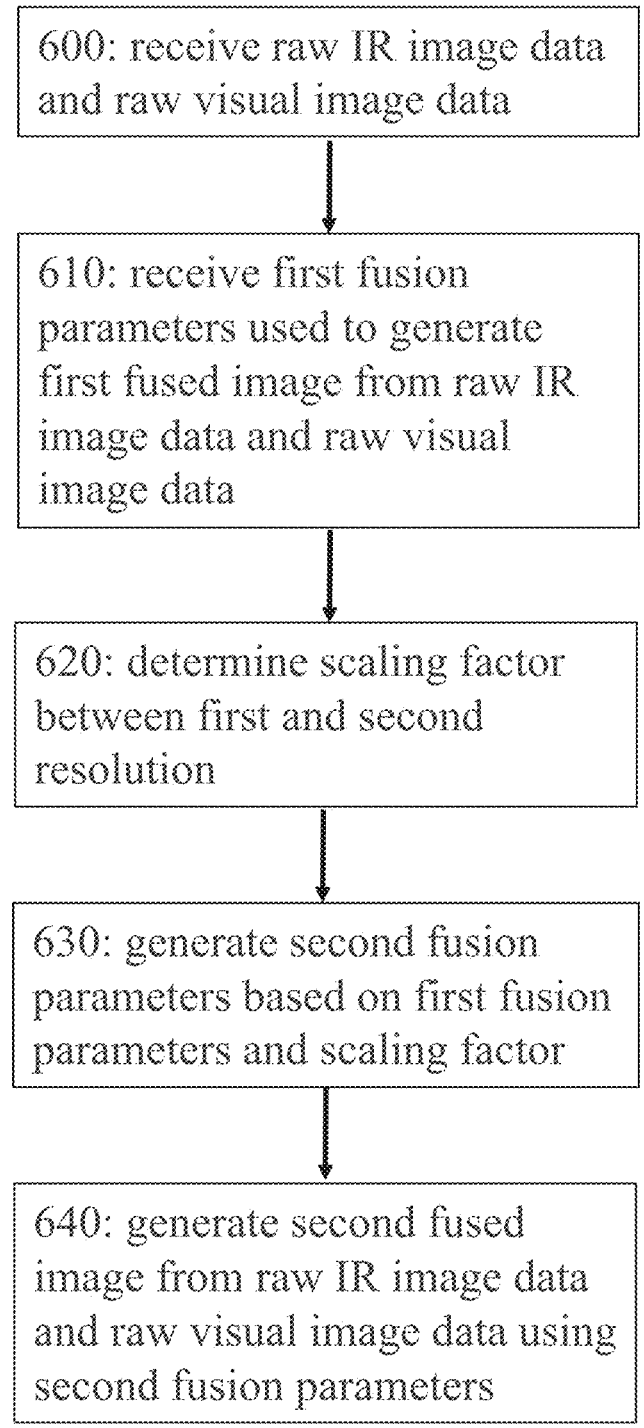
FIG. 6 is a flow chart of a method in accordance with one or more embodiments of the disclosure.

FIG. 6 is a flow chart of a method according to one or more embodiments. The method comprises:

In block 600: receiving, by a processor 420 configured to perform image processing, raw IR image data 502 and raw visual image data 504.

In block 610: obtaining, by said processor 420, a first set of fusion parameters 510 adapted to generate a first fused image based on the raw IR image data 502 and the visual image data 504.

The first set of fusion parameters 510 may be received by the processor 420, or obtained by the processor 420 when generating the first fused image, if this is generated by the same processor.

In block 620: determining a scaling factor 520 based on the difference between the first resolution and the second resolution.

In block 630: obtaining a second set of fusion parameters 530, generated based on said first set of fusion parameters 510 and said scaling factor 520. The second set of fusion parameters 530 may be generated in the processor 420, or received by the processor 420, e.g. if it has been generated in another processor.

In block 640: generating, in said processor 420, a second fused image by fusing the raw IR image data 502 and the raw visual image data 504 using said second set of fusion parameters 530.

In one or more embodiments, block 640 may comprise filtering the visual image using a second set of filter parameters, which control the filtering of the visual image to extract contour/edge information.

In one or more embodiments, block 640 may comprise resampling the raw IR image 502 using a resampling parameter $R_{I2}$, which is calculated based on the difference between the raw IR image resolution and the second resolution.

In one or more embodiments, block 640 may comprise resampling the raw visual image 504 using a resampling parameter $R_{V2}$, which is calculated based on the difference between the raw visual image resolution and the second resolution.

The second resolution may e.g. be the resolution of a selected display 440, or a predetermined resolution for printing on a printer 460.

The present disclosure comprises embodiments that may solve or at least reduce the problems illustrated in FIGS. 1b and 2b. The images of FIGS. 1b and 2b may then instead look like the image presented in FIG. 3b.

Further Embodiments

Embodiments of the disclosure achieve a computer-readable medium comprising, stored thereon, non-transitory information configured to control a processor/processing unit to perform any of the steps or functions of any of the embodiments described herein.

In one or more embodiments, there is provided a computer program product comprising code portions adapted to control a processor to perform any of the steps or functions of any of the embodiments described herein. Software in accordance with the present disclosure, such as program code portions and/or data, can be stored in non-transitory form on one or more machine-readable mediums. It is also contemplated that software identified herein can be implemented using one or more general purpose or specific purpose computers and/or computer systems, networked and/or otherwise.

Where applicable, one or more embodiments provided by the present disclosure can be implemented using hardware, software, or combinations of hardware and software. Also where applicable, the various hardware components and/or software components set forth herein can be combined into composite components comprising software, hardware, and/or both. Where applicable, the various hardware components and/or software components set forth herein can be separated into sub-components comprising software, hardware, or both. In addition, where applicable, it is contemplated that software components can be implemented as hardware components, and vice-versa. Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

The invention claimed is:

1. A method of generating a fused image optimized for a target resolution, the method comprising:
   receiving an infrared (IR) image captured by an IR imaging sensor;
   receiving a visible light (VL) image captured by a VL imaging sensor;
   determining a scaling factor based on a difference between the target resolution and a baseline resolution;
   determining a set of target fusion parameters at least by modifying, according to the scaling factor, a set of baseline fusion parameters associated with the baseline resolution; and
   generating the fused image having the target resolution at least by fusing the IR image and the VL image according to the set of target fusion parameters.

2. The method of claim 1, wherein:
   the set of baseline fusion parameters comprises one or more baseline filter parameters configured to control filtering of the VL image to extract contour/edge information for generating a fused image having the baseline resolution; and
   the set of target fusion parameters comprises one or more target filter parameters configured to control filtering of the VL image to extract contour/edge information for generating the fused image having the target resolution.

3. The method of claim 2, wherein the generating of the fused image having the target resolution comprises:
   filtering the VL image according to the one or more target filter parameters to extract the contour/edge information from the VL image; and
   adding the extracted contour/edge information to the IR image to generate the fused image.

4. The method of claim 2, wherein:
   the one or more baseline filter parameters comprise a baseline filter core size;
   the one or more target filter parameters comprise a target filter core size; and
   the determining of the set of target fusion parameters comprises scaling the baseline filter core size according to the scaling factor to determine the target filter core size.

5. The method of claim 4, wherein the scaling of the baseline filter core size is proportional to the scaling factor.

6. The method of claim 4, wherein:
   the one or more baseline filter parameters further comprise a baseline filter core shape;
   the one or more target filter parameters further comprise a target filter core shape; and
   the determining of the set of target fusion parameters comprises determining the target filter core shape by modifying the baseline filter core shape in response to the determined target filter core size being larger or smaller than a predetermine filter core size.

7. The method of claim 4, wherein:
   the set of baseline fusion parameters comprises a baseline alpha parameter $\alpha_1$ that determines the relative contribution of the IR image and the VL image in the fusing of the IR image and the VL image;
   the set of target fusion parameters comprises a target alpha parameter $\alpha_2$ that determines the relative contribution of the IR image and the VL image in the fusing of the IR image and the VL image; and
   the determining of the set of target fusion parameters comprises determining the target alpha parameter $\alpha_2$ by modifying the baseline alpha parameter $\alpha_1$ in response to the determined target filter core size being larger than a predetermine filter core size.

8. The method of claim 1, wherein:
   the set of baseline fusion parameters comprises a baseline alpha parameter $\alpha_1$ that determines the relative contribution of the IR image and the VL image in the fusing of the IR image and the VL image; and
   the set of target fusion parameters comprises a target alpha parameter $\alpha_2$ that determines the relative contribution of the IR image and the VL image in the fusing of the IR image and the VL image.

9. The method of claim 1, wherein:
   the set of target fusion parameters comprises:
      an IR image resampling parameter $r_{I2}$ determined based on a difference between the target resolution and a native resolution of the IR image; and
      a VL image resampling parameter $r_{V2}$ determined based on a difference between the target resolution and a native resolution of the VL image; and
   the generating of the fused image comprises scaling the IR image and the VL image according to the IR image resampling parameter $r_{I2}$ and the VL image resampling parameter $r_{V2}$, respectively.

10. The method of claim 1, further comprising displaying the generated fused image on a display having the target resolution or printing the generated fused image on a printer having the target resolution.

11. A system for generating a fused image optimized for a target resolution, the system comprising:
 a non-transitory memory storing machine-readable instructions and local data; and
 one or more processors configured to read the instructions and the local data from the non-transitory memory to cause the system to perform operations comprising:
  receiving an infrared (IR) image captured by an IR imaging sensor;
  receiving a visible light (VL) image captured by a VL imaging sensor;
  determining a scaling factor based on a difference between the target resolution and a baseline resolution;
  determining a set of target fusion parameters at least by modifying, according to the scaling factor, a set of baseline fusion parameters associated with the baseline resolution; and
  generating the fused image having the target resolution at least by fusing the IR image and the VL image according to the set of target fusion parameters.

12. The system of claim 11, further comprising:
an IR imaging system comprising the IR imaging sensor and communicatively coupled to the one or more processors; and
a VL imaging system comprising the VL imaging sensor and communicatively coupled to the one or more processors.

13. The system of claim 11, wherein:
the set of baseline fusion parameters comprises one or more baseline filter parameters configured to control filtering of the VL image to extract contour/edge information for generating a fused image having the baseline resolution;
the set of target fusion parameters comprises one or more target filter parameters configured to control filtering of the VL image to extract contour/edge information for generating the fused image having the target resolution; and
the generating of the fused image having the target resolution comprises:
 filtering the VL image according to the one or more target filter parameters to extract the contour/edge information from the VL image; and
 adding the extracted contour/edge information to the IR image to generate the fused image.

14. The system of claim 13, wherein:
the one or more baseline filter parameters comprise a baseline filter core size;
the one or more target filter parameters comprise a target filter core size; and
the determining of the set of target fusion parameters comprises scaling the baseline filter core size according to the scaling factor to determine the target filter core size.

15. The system of claim 14, wherein the scaling of the baseline filter core size is proportional to the scaling factor.

16. The system of claim 14, wherein:
the one or more baseline filter parameters further comprise a baseline filter core shape;
the one or more target filter parameters further comprise a target filter core shape; and
the determining of the set of target fusion parameters comprises determining the target filter core shape by modifying the baseline filter core shape in response to the determined target filter core size being larger or smaller than a predetermine filter core size.

17. The system of claim 14, wherein:
the set of baseline fusion parameters comprises a baseline alpha parameter $\alpha_1$ that determines the relative contribution of the IR image and the VL image in the fusing of the IR image and the VL image;
the set of target fusion parameters comprises a target alpha parameter $\alpha_2$ that determines the relative contribution of the IR image and the VL image in the fusing of the IR image and the VL image; and
the determining of the set of target fusion parameters comprises determining the target alpha parameter $\alpha_2$ by modifying the baseline alpha parameter $\alpha_1$ in response to the determined target filter core size being larger than a predetermine filter core size.

18. The system of claim 11, wherein:
the set of baseline fusion parameters comprises a baseline alpha parameter $\alpha_1$ that determines the relative contribution of the IR image and the VL image in the fusing of the IR image and the VL image; and
the set of target fusion parameters comprises a target alpha parameter $\alpha_2$ that determines the relative contribution of the IR image and the VL image in the fusing of the IR image and the VL image.

19. The system of claim 11, wherein:
the set of target fusion parameters comprises:
 an IR image resampling parameter $r_{I2}$ determined based on a difference between the target resolution and a native resolution of the IR image; and
 a VL image resampling parameter $r_{V2}$ determined based on a difference between the target resolution and a native resolution of the VL image; and
the generating of the fused image comprises scaling the IR image and the VL image according to the IR image resampling parameter $r_{I2}$ and the VL image resampling parameter $r_{V2}$, respectively.

20. The system of claim 11, further comprising:
a display communicatively coupled to the one or more processors and configured to display the generated fused image at the target resolution; or
a printer communicatively coupled to the one or more processors and configured to print the generated fused image at the target resolution.

* * * * *

UNITED STATES PATENT AND TRADEMARK OFFICE
CERTIFICATE OF CORRECTION

PATENT NO. : 10,803,559 B2
APPLICATION NO. : 16/243356
DATED : October 13, 2020
INVENTOR(S) : Katrin Strandemar Page 1 of 1

It is certified that error appears in the above-identified patent and that said Letters Patent is hereby corrected as shown below:

In the Specification

In Column 1, Line 24, change "resealing" to --rescaling--

In Column 1, Line 41, change "be resealed" to --be rescaled--

In Column 1, Line 41, change "A resealed" to --A rescaled--

In Column 2, Line 12, change "the resealed" to --the rescaled--

In Column 4, Line 8, change "resealing" to --rescaling--

In Column 5, Line 38, change "resealing" to --rescaling--

In Column 5, Line 53, change "resealed" to --rescaled--

In Column 6, Line 4, change "resealed" to --rescaled--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*